(12) United States Patent
Tighe

(10) Patent No.: US 7,671,482 B2
(45) Date of Patent: Mar. 2, 2010

(54) HYDROGEN POWERED VEHICLE REFUELING STRATEGY

(75) Inventor: Thomas W. Tighe, Bloomfield, NY (US)

(73) Assignee: GM Global Technology Operations, Inc., Detroit, MI (US)

( * ) Notice: Subject to any disclaimer, the term of this patent is extended or adjusted under 35 U.S.C. 154(b) by 408 days.

(21) Appl. No.: 11/670,756

(22) Filed: Feb. 2, 2007

(65) Prior Publication Data

US 2008/0185912 A1 Aug. 7, 2008

(51) Int. Cl.
*B60L 3/04* (2006.01)
*B65B 3/26* (2006.01)

(52) U.S. Cl. ........................................ 307/9.1; 141/348

(58) Field of Classification Search ................... 307/9.1, 307/10.1; 141/206, 207, 94, 348
See application file for complete search history.

(56) References Cited

U.S. PATENT DOCUMENTS

| 3,572,305 | A | | 3/1971 | Moragne | |
| 5,720,327 | A | * | 2/1998 | Foster, Jr. | 141/207 |
| 6,011,484 | A | | 1/2000 | Dietl et al. | |
| 6,712,171 | B2 | | 3/2004 | Farmer | |
| 6,964,821 | B2 | | 11/2005 | Hirakata | |
| 7,051,831 | B2 | * | 5/2006 | Scholer et al. | 180/286 |
| 7,171,989 | B2 | * | 2/2007 | Corless et al. | 141/2 |
| 2006/0011164 | A1 | | 1/2006 | Kropinski et al. | |

FOREIGN PATENT DOCUMENTS

EP 1 116 913 A2 7/2001

* cited by examiner

*Primary Examiner*—Albert W Paladini
(74) *Attorney, Agent, or Firm*—Fraser Clemens Martin & Miller LLC; J. Douglas Miller

(57) ABSTRACT

A method for refueling hydrogen fuel cell powered vehicles is disclosed, that is capable of automatically disabling the vehicle systems, resetting the vehicle systems to allow for normal vehicle operation after the refueling event is complete, and determining if a faulty refueling event has been detected and allows normal vehicle operation.

20 Claims, 2 Drawing Sheets

HYDROGEN POWERED VEHICLE REFUELING STRATEGY

FIELD OF THE INVENTION

This invention relates to a method of operation of a hydrogen fuel cell powered vehicle. More particularly, this invention is directed to a method of refueling a hydrogen fuel cell powered vehicle.

BACKGROUND OF THE INVENTION

Vehicle fueling stations typically require that vehicles be turned off during refueling to minimize the risks of vehicle damage associated with vehicle operation during the refueling process. Ensuring vehicles are not operated during refueling is primarily accomplished through enforcement by fueling station attendants, or is a voluntary process depending upon the cooperation of the vehicle operator.

As hydrogen fuel cell power plants are increasingly being integrated into vehicles, preventing operators from driving away during refueling is becoming increasingly important in order to prevent damage to both the vehicle and fuel station equipment.

It would be desirable to have a hydrogen refueling system that automatically disables vehicle systems in order to militate against damage to the vehicle when refueling is occurring. It would be further desirable to have a hydrogen vehicle refueling system that resets the vehicle systems after the refueling event is complete. Also, it would further be desirable to have a hydrogen refueling system that determines if a faulty refueling event has been detected and maintains typical vehicle operation.

SUMMARY OF THE INVENTION

According to the present invention, a hydrogen fueling system that automatically disables vehicle systems when refueling is occurring, resets the vehicle systems after the refueling is complete, and determines if a faulty refueling event has been detected has surprisingly been discovered.

In one embodiment, the method of refueling a hydrogen fuel cell powered vehicle, includes the steps of providing a traction drive system, a control system in electrical communication with the traction drive system, and at least one refueling sensor in electrical communication with the control system; determining the vehicle is refueling using the refueling sensors; communicating a vehicle refueling signal from the refueling sensors to the control system; and disabling the traction drive system using the control system when a vehicle refueling signal is received.

In another embodiment, the method of refueling a hydrogen fuel cell powered vehicle, includes the steps of providing a traction drive system, a control system in electrical communication with the traction drive system, at least one fuel inlet sensor in electrical communication with the control system, and at least one fuel tank sensor in electrical communication with the control system; determining vehicle refueling using the fuel inlet sensor; determining vehicle refueling using the fuel tank sensor; communicating a first vehicle refueling signal from the fuel inlet sensor and a second refueling signal from the fuel tank sensor to the control system; disabling the traction drive system using the control system when a vehicle refueling signal is received; and re-enabling the traction drive system using the control system when the refueling is complete.

In another embodiment, the method of refueling a hydrogen fuel cell powered vehicle, includes the steps of providing a traction drive system, a control system in electrical communication with the traction drive system, at least one fuel inlet sensor in electrical communication with the control system, and at least one fuel tank sensor in electrical communication with the control system; determining vehicle refueling using the fuel inlet sensor; determining vehicle refueling using the fuel tank sensor; communicating a first vehicle refueling signal from the fuel inlet sensor and a second refueling signal from the fuel tank sensor to the control system; determining a faulty refueling signal when the first refueling signal and the second refueling signal do not both communicate a refueling signal to the control system within, a predetermined time period; disabling the traction drive system using the control system when the vehicle refueling signal received is not faulty; and re-enabling the traction drive system using the control system when the refueling is complete.

DESCRIPTION OF THE DRAWINGS

The above, as well as other advantages of the present invention, will become readily apparent to those skilled in the art from the following detailed description of a preferred embodiment when considered in the light of the accompanying drawings in which.

DETAILED DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1:
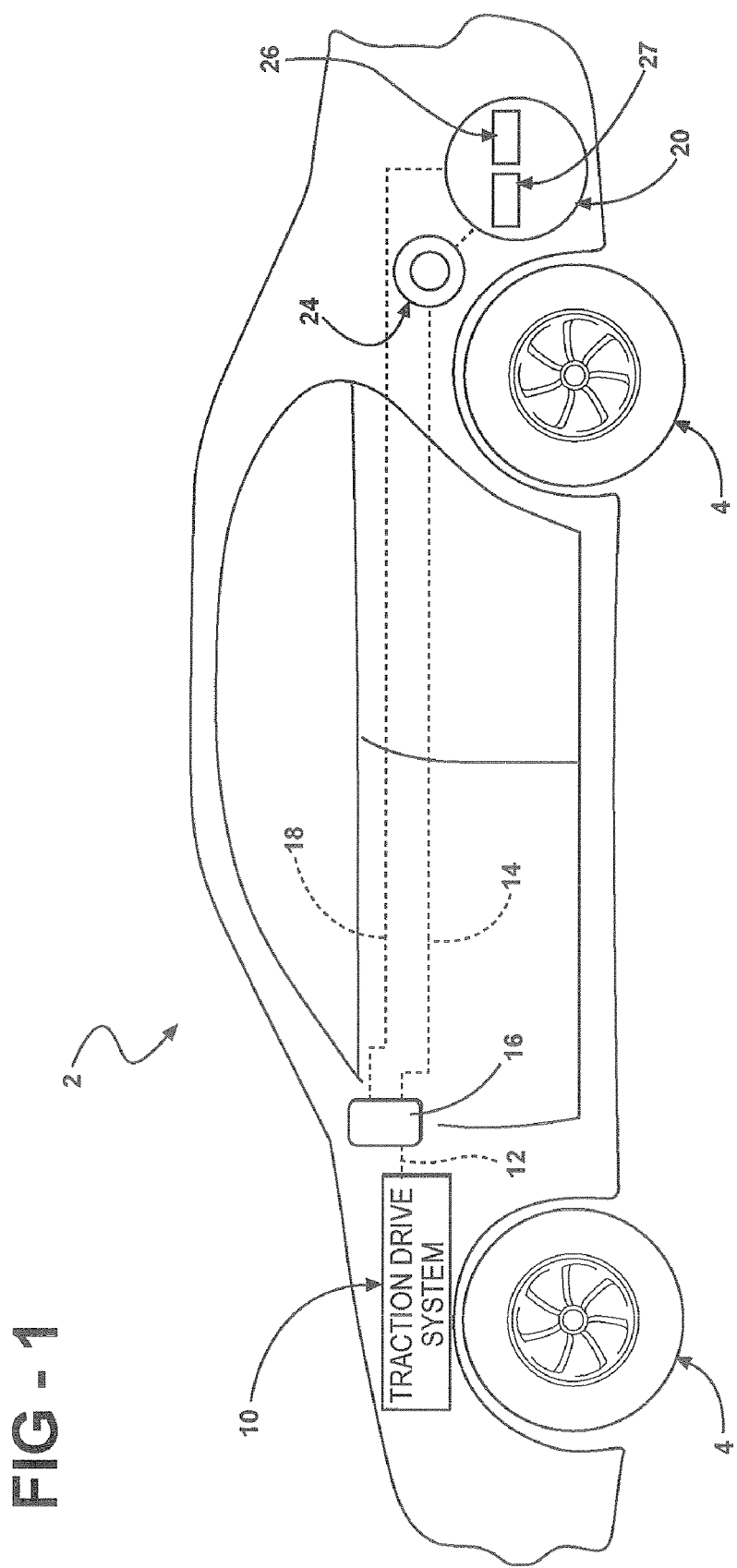
FIG. 1 is a schematic illustration of a hydrogen powered vehicle with refueling system components of the present invention.

In the exemplary embodiment described herein, the hydrogen powered vehicle refueling strategy is provided in a vehicle 2, as shown in FIG. 1. The vehicle 2 includes a traction drive system or vehicle system 10. It is understood that other vehicle systems can be used as desired. A plurality of wheels 4 are mechanically coupled to the traction drive system 10. The traction drive system 10 is electrically linked to a control system 16 via a connection 12. The connection 12 may be any conventional means of electrical communication.

A fuel inlet 24 is formed in the vehicle 2 and is in fluid communication with a fuel tank 20. The fuel inlet 24 includes at least one fuel inlet sensor, such as a fuel door switch 40, and a fuel nozzle sensor 42, for example, as clearly shown in FIG. 2. The fuel inlet sensor is in electrical communication with the control system 16 via an electrical connection 14. The fuel tank 20 includes at least one fuel tank sensor, such as a temperature sensor 26, and a pressure sensor 27. The fuel tank sensor is in electrical communication with the control system 16 via an electrical connection 18. Additionally, the vehicle 2 may include other sensors without departing from the scope of this invention.

Figure 2:
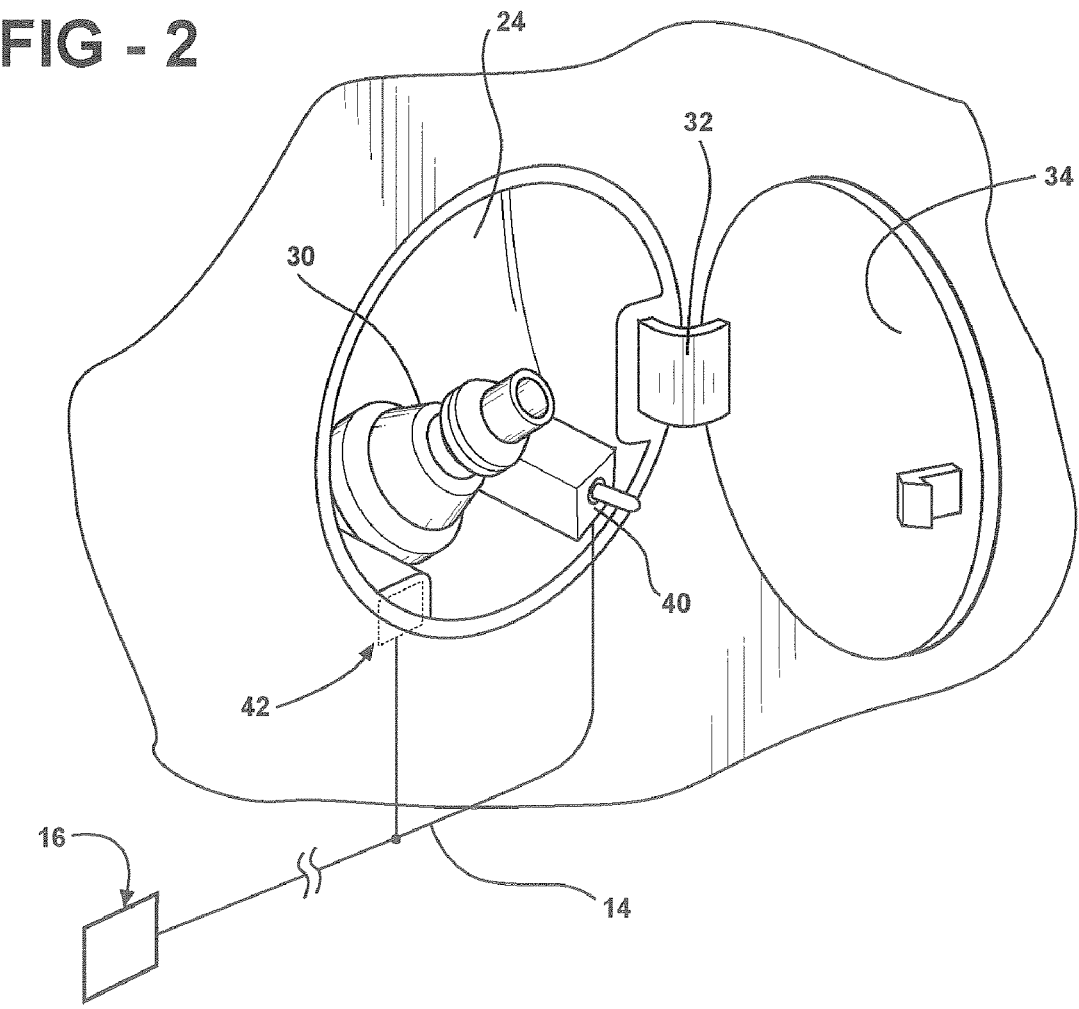
FIG. 2 shows a fragmentary perspective view of a fuel door in the open position and showing the control systems schematically according to the embodiment of the invention shown in FIG. 1.

Referring now to FIG. 2, a fuel inlet door 34 is pivotally connected to the fuel inlet 24 via a hinge 32. An aperture 30 is formed in the fuel inlet 24. The aperture 30 is adapted to receive a hydrogen fuel pump nozzle (not shown). The fuel door switch 40 is disposed adjacent the fuel inlet 24 to sense when the fuel door 34 is in an open or closed position. The fuel inlet sensor 42 is disposed near the aperture 30 to sense when a hydrogen fuel pump nozzle is inserted in the aperture 30. The fuel door switch 40 and the fuel nozzle sensor 42 generate and transmit a refueling signal to the control system 16 via the connection 14. Other sensors may be used without departing from the scope of this invention.

In operation, the traction drive system 10 controls whether power generated by a fuel cell is sent to the vehicles wheels 4 and/or whether the traction drive system converts the available power to mechanical work. The control system 16 selectively controls the traction drive system 10 via the communication 12.

Figure 3:
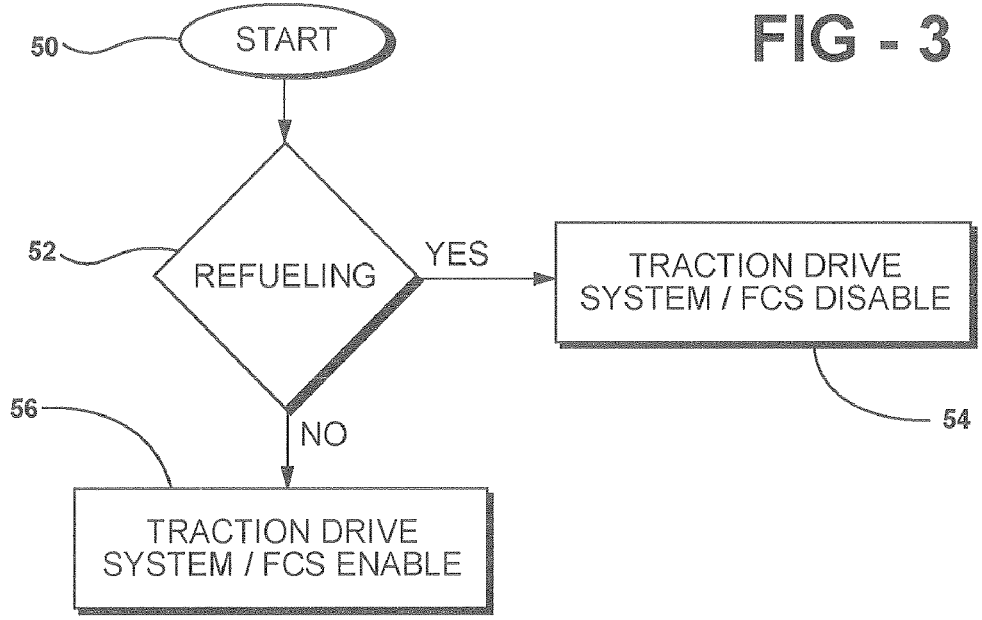
FIG. 3 is a flow diagram illustrating a method of operation of the present invention.

The control system 16 disables the traction drive system 10 when vehicle refueling occurs (Y at 52), shown in FIG. 3. Disabling the traction drive system 10 prevents a user from driving away while the vehicle 2 is being refueled. The control system 16 enables the traction drive system 10 when refueling is not occurring (N at 52). Additionally, it may be desirable for the control system 16 to disable other vehicle 2 systems, such as the fuel cell power system (not shown), when refueling is detected.

In the embodiment shown and described herein, refueling is communicated to the control system 16 in several methods. A first refueling signal is communicated to the control system 16 from the at least one fuel inlet sensor via the connection 14. It may be desirable to communicate the first refueling signal from the fuel nozzle sensor 42. When a hydrogen fuel pump nozzle is detected in the aperture 30 the fuel nozzle sensor 42 generates and transmits a signal that refueling is occurring (Y at 52) to the control system 16. Alternatively, it may be desirable to communicate the first refueling signal from the fuel door switch 40. When the fuel door 34 is an open position the fuel door switch 40 generates and transmits a signal that refueling is occurring (Y at 52) to the control system 16. It may desirable for the fuel door switch 40, and the fuel inlet sensor 42 to be contact sensors such as micro-switches, or non-contact sensors such as proximity sensors. Additionally, other types of sensors or combinations of sensors may be used without departing from the scope of this invention.

A second refueling signal is sent to the control system 16 from the at least one fuel tank sensor via the connection 18. It may be desirable to send the second refueling signal from the temperature sensor 26. When a sudden drop in fuel tank 20 temperature is detected the temperature sensor 26 generates and transmits a signal to the control system 16. It may be further desirable to communicate the second refueling signal from the pressure sensor 27. When rapidly rising fuel tank 20 pressure is detected, the pressure sensor 27 generates and transmits a signal to the control system 16. Additionally, other types of sensors may be used without departing from the scope of this invention.

Additionally, it may be desirable to use both the first refueling signal and the second refueling signal together in order to determine whether a faulty refueling signal has been communicated to the control system 16. For example, if the control system 16 receives the first refueling signal from the fuel door switch 40, and does not receive a second refueling signal from the pressure sensor 27 within a predetermined time period, the control system 16 could determine that the fuel door switch 40 sent a faulty signal and the system may be re-enabled because refueling is not taking place.

When the control system 16 determines that refueling is complete or not occurring (N at 52) the traction drive system 10 is re-enabled. It may be desirable to implement a time delay before re-enabling the traction drive system 10 in order to ensure that the refueling process is complete.

From the foregoing description, one ordinarily skilled in the a can easily ascertain the essential characteristics of this invention and, without departing from the spirit and scope thereof, make various changes and modifications to the invention to adapt it to various usages and conditions.

What is claimed is:

1. A method of controlling a hydrogen fuel cell powered vehicle during a refueling operation, the method comprising the steps of:
   (a). providing a vehicle system, a control system in electrical communication with the vehicle system, and at least one refueling sensor in electrical communication with the control system;
   (b). determining whether the vehicle is refueling with hydrogen using the refueling sensors;
   (c). generating and transmitting a vehicle refueling signal from the refueling sensors to the control system; and
   (d). disabling the vehicle system using the control system when a vehicle refueling signal is received.

2. The method according to claim 1, wherein the refueling sensor is at least one of a fuel door switch, a fuel nozzle sensor, a fuel tank temperature sensor, and a fuel tank pressure sensor.

3. The method according to claim 1, including performing said step (a) by providing a first refueling sensor and a second refueling sensor.

4. The method according to claim 3, further comprising the step of determining a faulty refueling signal when at least one of the first refueling signal and the second refueling signal fail to communicate a refueling is occurring to the control system within a predetermined time period.

5. The method according to claim 4, further comprising the step of enabling the vehicle system using the control system when a faulty refueling signal is determined.

6. The method according to claim 1, further comprising the step of using the control system to enable the vehicle system when the refueling is complete.

7. The method according to claim 6, further comprising the step of implementing a time delay before re-enabling the vehicle system when the refueling is complete.

8. The method according to claim 1, further comprising the step of disabling the fuel cell power system using the control system when the vehicle is refueling.

9. The method according to claim 1, wherein the vehicle system is a traction drive system.

10. A method of controlling a hydrogen fuel cell powered vehicle during a refueling operation, the method comprising the steps of:
   (a). providing a vehicle system, a control system in electrical communication with the vehicle system, at least one fuel inlet sensor in electrical communication with the control system, and at least one fuel tank sensor in electrical communication with the control system;
   (b). determining vehicle refueling with hydrogen using the fuel inlet refueling sensor;
   (c). determining vehicle refueling with hydrogen using the fuel tank refueling sensor;
   (d). generating and transmitting a first vehicle refueling signal from the fuel inlet sensor and a second refueling signal from the fuel tank sensor to the control system;
   (e). disabling the vehicle system using the control system when a vehicle refueling signal is received; and (f). re-enabling the vehicle system using the control system when the refueling is complete.

11. The method according to claim 10, wherein the fuel inlet sensor is at least one of a fuel door switch, and a fuel nozzle sensor.

12. The method according to claim 10, wherein the fuel tank sensor is at least one of a fuel tank temperature sensor, and a fuel tank pressure sensor.

13. The method according to claim 10, further comprising the step of determining a faulty refueling signal when the fuel inlet sensor and the fuel tank sensor do not both communicate a vehicle refueling is occurring to the control system within a predetermined time period.

14. The method according to claim 13, further comprising the step of enabling the traction drive system using the control system when a faulty refueling signal is determined.

15. The method according to claim 9, further comprising the step of disabling the fuel cell power system using the control system when the vehicle is refueling.

16. A method of controlling a hydrogen fuel cell powered vehicle during a refueling operation, the method comprising the steps of:
   (a). providing a traction drive system, a control system in electrical communication with the traction drive system, at least one fuel inlet sensor in electrical communication with the control system, and at least one fuel tank sensor in electrical communication with the control system;
   (b). detecting vehicle refueling with hydrogen using the fuel inlet sensor;
   (c). detecting vehicle refueling with hydrogen using the fuel tank sensor;
   (d). generating and transmitting a first vehicle refueling signal from the fuel inlet sensor and a second refueling signal from the fuel tank sensor to the control system;
   (e). determining a faulty refueling signal when the first refueling signal and the second refueling signal do not both communicate a refueling is occurring to the control system within a predetermined time period;
   (f). disabling the vehicle system using the control system when the vehicle refueling signal received is not faulty; and
   (g). re-enabling the vehicle system using the control system when the refueling is complete.

17. The method according to claim 16, wherein the fuel inlet sensor is at least one of a fuel door switch, a fuel nozzle sensor.

18. The method according to claim 16, wherein the fuel tank sensor is at least one of a fuel tank temperature sensor, and a fuel tank pressure sensor.

19. The method according to claim 16, further comprising the step of disabling the fuel cell power system using the control system when the vehicle is refueling.

20. The method according to claim 16, further comprising the step of implementing a time delay before re-enabling the vehicle system when the refueling is complete.

* * * * *